United States Patent [19]

Michel

[11] Patent Number: 5,534,163
[45] Date of Patent: Jul. 9, 1996

[54] CENTER COLUMN EXTENSION FOR A CLARIFIER

[75] Inventor: John H. Michel, Baltimore, Md.

[73] Assignee: Westvaco Corporation, New York, N.Y.

[21] Appl. No.: 493,942

[22] Filed: Jun. 23, 1995

[51] Int. Cl.$^6$ .................................................. B01D 21/24
[52] U.S. Cl. .......................... 210/800; 210/232; 210/519; 210/528; 210/541
[58] Field of Search .................................. 210/800, 801, 210/803, 232, 519, 525, 528, 541

[56] References Cited

U.S. PATENT DOCUMENTS

| 2,140,059 | 12/1938 | Simonsen | 210/519 |
|---|---|---|---|
| 2,568,452 | 9/1951 | Kelly et al. | 210/528 |
| 2,713,026 | 7/1955 | Kelly et al. | 210/528 |
| 3,175,692 | 3/1965 | Vrablik | 210/519 |
| 3,486,628 | 12/1969 | Darby | 210/520 |
| 3,951,816 | 4/1976 | Bascope et al. | 210/519 |
| 4,915,823 | 4/1990 | Hall | 210/519 |
| 4,948,518 | 8/1990 | Turgay | 210/803 |
| 5,264,126 | 11/1993 | Shurtliff | 210/528 |

Primary Examiner—Christopher Upton

[57] ABSTRACT

A clarifier having a center column is provided with means in the form of a center column extension which may be attached to the center column to allow repairs or maintenance to be conducted on the clarifier inlet piping without shutting down the operation of the clarifier.

8 Claims, 1 Drawing Sheet

CENTER COLUMN EXTENSION FOR A CLARIFIER

BACKGROUND OF INVENTION

The present invention relates generally to clarifiers and like devices for separating and removing solids from a liquid suspension, and more particularly to an improvement in a clarifier which will allow the clarifier to continue its normal operation while maintenance or repairs are carried out.

It is customary to subject sewage and other waste waters containing suspended solids to sedimentation using a process called clarification, wherein the solids settle out, and are removed. A variety of equipment is available for such an operation. However, repairs and maintenance to such equipment is difficult to carry out without shutting down the operation of the clarifier. This is a high risk approach since many clarifiers presently in use are operating at or near their design capacity.

Clarification using a typical center column clarifier is conducted by introducing the liquid suspension to be clarified into a circular tank from below through an incoming effluent pipe and up a center column. The effluent exits the center column at a point below the nominal level of the pool of liquid in the clarifier tank. The liquid suspension in the tank is gently agitated so that the solids are settled out. The clarified liquid is removed at an overflow generally referred to as a launder, located near the periphery of the top of the tank, and the settled solids are raked from the bottom of the tank, where they are collected in a sludge pit for removal. The flow of the liquid suspension up through the center column and out into the tank is forced by a hydraulic head from the source or by pumping. In operation, the clarified liquid removed from the tank is either further treated, or is discharged into a suitable pond, river or the like. Meanwhile, the solid material is collected by the rakes at the bottom of the tank and is pumped offsite where it can be stored or disposed of as for example, by recycling, burning or other means. Because the clarification process is essentially a continuous process, it may be seen that shutting down the clarifier for maintenance or repairs is risky and can cause interruptions in service or back-ups that are undesirable.

Examples of typical clarifier installations are shown for example in the following U.S. Pat. Nos. 2,568,452; 2,713,026; 3,175,692; and 3,486,628. However, none of these patents address the need for providing for the continued operation of the clarifier during maintenance or repair.

SUMMARY OF INVENTION

The present invention is directed to an improvement in a center column clarifier which will permit the continued operation of the clarifier while repairs are being made to the incoming effluent piping and center column distributor.

Center column clarifiers according to the present invention are provided with effluent piping at least a portion of which is buried underground. This piping and the center column itself are subject to deterioration, and require routine maintenance and repair. Unfortunately, access to this piping has only been available in the past by actually shutting down and pumping out the clarifier tank. Obviously such an extreme measure is undesirable at best, and sometimes impossible to do, particularly where the clarifier is operating on a continuous basis. Thus it may be seen that there is a need in the art for providing a means whereby repairs and maintenance can be conducted on clarifier tanks, particularly to the incoming effluent piping and center column distributor, while still maintaining the normal operation of the clarifier.

Accordingly, it is a general object of the present invention to provide an improvement for a center column clarifier that will allow the continued operation of the clarifier while performing repairs and maintenance.

A further object of the invention is the development of a process, in conjunction with the aforementioned improvements, to permit the continued use of the clarifier during repairs to the effluent piping of the clarifier tank.

A still further object is the provision of an improvement for the clarifier tank which may be installed for making repairs, and subsequently removed when conventional operation of the clarifier is to be resumed.

In carrying out the above and other objects of the present invention, the improvement disclosed herein is designed to isolate the effluent piping to the clarifier and the center column distributor, while the liquid suspension to be clarified is diverted and pumped directly into the clarifier tank via another route. In this manner, the effluent piping and center column distributor can be safely and efficiently inspected and repaired while the clarifier remains in service.

The process of the present invention is carried out by temporarily interrupting the forced flow of effluent through the effluent piping and up the center column so that a center column extension may be attached to the top of the center column. After the extension is in place, the effluent to be clarified is pumped directly into the tank via another route and the operation of the clarifier is resumed for the duration of the repairs or maintenance. After the work is finished, the operation of the clarifier is interrupted once again, the center column extension is removed, and conventional operation of the clarifier is resumed by using the center column distributor.

In order that the invention may be more readily understood, reference is made to the accompanying drawings and the detailed description thereof which are offered by way of example only, and are not to be taken as limiting the invention, the scope of which is defined by the appended claims.

IN THE DRAWING

FIG. 1 is a vertical schematic section through a typical clarifier tank showing the improvement of the present invention installed; and, FIG. 2 is an enlarged cross section showing a typical installation for the center column extension of the present invention.

DETAILED DESCRIPTION

Figure 1:
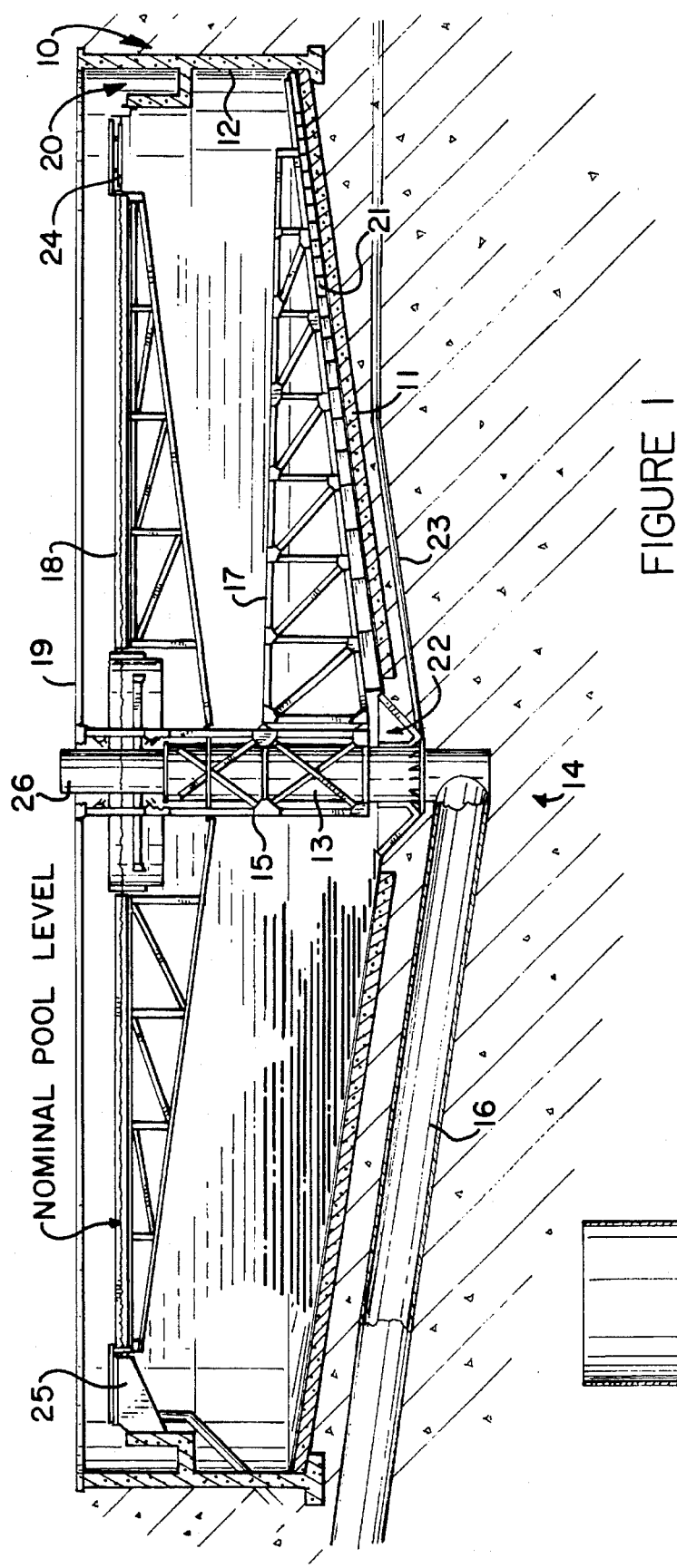

The clarifier tank illustrated in FIG. 1 comprises a conventional round tank 10 constructed from concrete or the like, having a gently sloping inverted conical bottom 11, and a vertical wall 12. The vertical wall 12 of the tank 10 is shown to have a peripheral overflow launder 20 into which the clarified liquid overflows. The tank 10 further includes a centrally located center column distributor 13 rising vertically from the base 14. The center column 13 is connected at its lower end to an underground feed pipe 16 which supplies effluent to the tank 10 for clarification.

The incoming effluent is forced under pressure up the center column distributor 13 and radially out into the tank 10. The effluent enters the tank 10 at a point below the nominal level of the liquid pool in the tank which is established by the elevation of the peripheral launder 20. A center cage 15 is arranged around the center column 13 which provides support for skimmer devices 18 at the top thereof and rake arms 17 at the lower end. A superstructure or bridge 19 extends across the top of the tank 10 for supporting the top of the center cage 15. Suitable bearings are provided for the center cage structure 15 and the skimmer devices 18 and rake arms 17, which allow these elements to be rotated about the center column 13 by a drive means (not shown). Conventional rakes 21 attached to the rake arms 17 move sludge which settles to the bottom of the tank 10 to a sludge pit 22 where it is collected and pumped from the tank through an outlet pipe 23. Meanwhile, the skimmer devices 18 include scum baffles 24 which direct any scum which collects on top of the liquid pool into scum collectors 25 for disposal. Each of the features described above are more-or-less conventional for all clarifier tanks.

The improvement which comprises the present invention, lies in the provision whereby a center column extension 26 may be installed at the top of the center column 13 when it is desired or necessary to provide maintenance or repairs to the inlet piping 16 or the center column distributor.

The center column extension 26 is designed to have a height which extends above the nominal level of the pool of liquid in tank 10, and to block the outlet from the center column distributor 13. Installation of the center column extension 26 is accomplished by first temporarily interrupting the flow of effluent through pipe 16 and up through the center column distributor 13. Sufficient effluent is then pumped from the tank 10 to reduce the level of the effluent pool to a point below the outlet of the center column distributor 13, and the center column extension 26 is bolted into place. After the extension 26 is attached, the inlet piping and center column are essentially isolated from the rest of the tank 10, and, the flow of effluent to be treated can be resumed via another means directly to tank 10, so that the clarifier may continue in operation. With the center column extension 26 in place, the level of the effluent pool will return to normal without any danger of the incoming effluent leaking back into the center column distributor 13. Meanwhile, the remaining effluent trapped in inlet piping 16 and center column 13 can be pumped out, providing unrestricted access to both for any repairs or maintenance as necessary, while the clarifier continues in operation.

Figure 2:
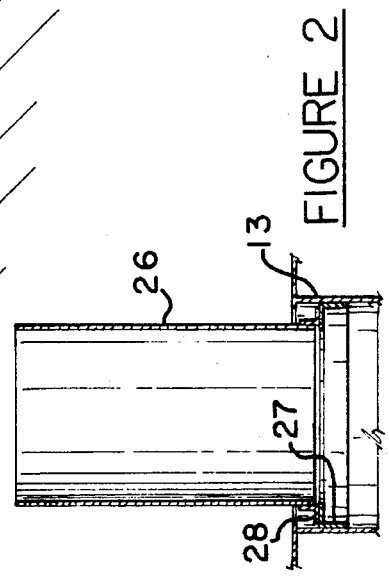

FIG. 2 illustrates at least one method for attaching the center column extension 26 to the center column distributor 13. As shown, an angle bracket 27 is attached to the center column 13 by welding or the like, and a complimentary bracket 28 is similarly attached to the bottom of the column extension 26. These elements are mated together using appropriate gasket material and bolted to provide a secure and substantially liquid tight joint.

After the necessary repairs or maintenance to inlet piping 16 and the center column 13 is finished, the process is repeated to remove the center column extension 26 from the center column 13. Once removed, the effluent may once again be introduced into tank 10 via the inlet piping 16 and center column distributor 13.

Accordingly, in brief summary, the present invention contemplates an improvement to a center column clarifier wherein an extension may be mounted on the top of the center column, when it is desired to conduct repairs or maintenance on the inlet pipe or center column itself, without actually shutting down the clarifier. Thus, while only a single embodiment of the invention has been fully disclosed and described herein it will be understood by those skilled in the art that changes and modifications therein may be made within the scope of the appended claims.

What is claimed is:

1. A method for preparing a clarifier tank for repairs or maintenance, said tank having underground inlet piping and a center column distributor with a discharge opening below the normal level of the liquid pool in the clarifier comprising:

(a) temporarily interrupting the flow of effluent to be clarified to the clarifier tank;

(b) pumping effluent from the clarifier tank to achieve a liquid level below the discharge opening of the center column distributor;

(c) installing a center column extension at the top of the center column distributor; and, (d) restoring the flow of effluent to be clarified to the clarifier tank by pumping the effluent directly into the clarifier tank via an alternate route thereby bypassing the underground inlet piping and center column distributor.

2. The method of claim 1 wherein the operation of the clarifier is continued throughout each of steps (a) through (d).

3. The method of claim 2 wherein the center column extension of step (c) has a nominal height greater than the normal level of the liquid pool in the clarifier.

4. The method of claim 3 which permits maintenance and repairs to be carried out on the center column distributor and the inlet piping leading to the center column distributor without shutting down the operation of the clarifier.

5. A clarifier comprising in combination, a substantially round tank having an open top, substantially vertical side walls and a gently sloping inverted conical bottom, and a center column distributor located centrally of said tank, said center column distributor being connected to a source of effluent to be clarified via underground piping which extends underneath the tank for discharge into the tank from the center column distributor at a point below the normal operating level of the effluent pool in the tank, the improvement comprising a removeable center column extension mounted at the top of the center column distributor which isolates the inlet piping and center column from the tank providing means to permit repairs or maintenance to be conducted on the inlet piping and center column distributor without shutting down the normal operation of the clarifier.

6. The tank of claim 5 wherein each of the center column and the center column extension include mating angle brackets for attaching the extension to the center column.

7. The tank of claim 6 wherein the center column extension has a nominal height that extends above the nominal level of the liquid pool in the clarifier tank during normal operation.

8. The tank of claim 7 wherein the center column extension blocks the reverse flow of effluent back into the center column distributor while repairs are being made.

* * * * *